Patented Mar. 3, 1931

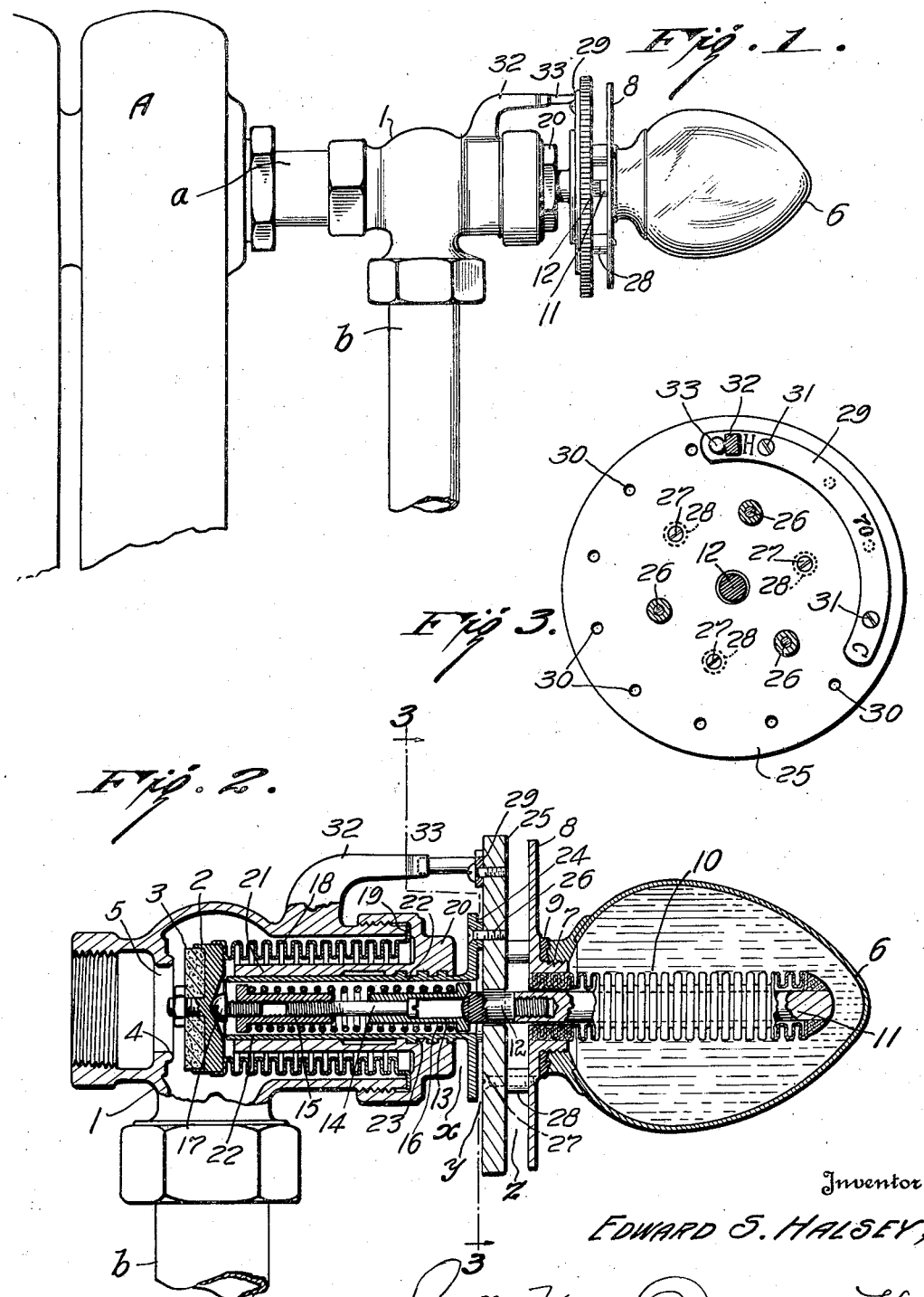

1,794,610

UNITED STATES PATENT OFFICE

EDWARD S. HALSEY, OF WASHINGTON, DISTRICT OF COLUMBIA

THERMOSTATIC VALVE FOR RADIATORS AND THE LIKE

Application filed January 19, 1929. Serial No. 333,604.

The invention relates to thermostatic controllers for the steam inlet valve of radiators of the type in which the controller is directly associated with the radiator to control the same individually.

The invention consists in the features and combination and arrangement of parts hereinafter described and particularly pointed out in the claims.

In the drawings:

Fig. 1 is a side elevation of a regulator applied to a radiator, only a portion of the latter being shown.

Fig. 2 is a central longitudinal sectional view of the regulator, with the steam valve slightly advanced towards its seat, by the thermostatic mechanism.

Fig. 3 is a sectional view of Fig. 1 on line 3—3.

In these drawings A is a portion of the radiator on which the appliance is mounted by a coupling $a$. The steam supply pipe is at $b$ and the valve body is at 1.

The supply of steam to the radiator is controlled by a valve made up of disc 2 having a Jenkins packing disc 3 to engage the valve seat 4 for closing the inlet port 5. This valve is automatically controlled by thermostatic means which includes a container or cell 6 for a material expansible by heat. It may also be controlled by a hand operation of the parts to shut off steam from or supply the steam to the radiator, certain of the parts belonging to the thermostatic control entering into the manual operation.

In carrying out my invention I have sought to provide a valve controlling mechanism capable of automatic operation according to room temperature, capable of operation by hand and capable of adjustment for various temperatures, in which the elements will be few, of economical construction, susceptible of ready and quick assembly, and in which elements perform plural functions in respect to automatic, manual and adjustment operations.

The container 6 for the expansible medium or fluid is of a form to act as a handle for the manual operation of the valve when desired. It is screw threaded onto a boss 7 of a metallic disc 8. Packing is interposed at 9 to make a liquid-tight joint. Extending axially into this container is a bellows 10 which is mounted liquid-tight at one end in an opening in the boss 7. At its free end this bellows is soldered to an operating rod 11 extending within and coaxially with the bellows. This rod has screw threaded into its end the shank of a member 12 of wood or other heat insulating material, which at its free end bears upon the outer end of a flanged thimble 13. This thimble is slidably connected by a screw 14 with a second flanged thimble 15 which is spaced apart from the first thimble.

The screw is threaded into the thimble 15 and has its head slidably engaging within the thimble 13 first mentioned. On these thimbles and between the flanges thereof is a helical spring 16, a screw 17 is carried at the end of the thimble 15, being screw threaded into the bore thereof for adjustment as to length.

These two thimbles slidably united by screw 14 and held apart by spring 16 under a fixed tension, sufficient to seat the valve before yielding, constitute an actuating plunger unit between the thermostat and the valve disk. This yielding unit simultaneously acts as a safety relief for the expansion of the thermostat after the valve is closed.

The head of screw 17 bears against the valve 2 which controls the entrance of steam through the supply pipe $b$, valve body, and port 5 to the radiator.

The steam valve is attached to the free end of a bellows 18 which extends coxially with the thimbles, pressure spring and valve, and is supported by the valve body, said bellows having a flange 19 embracing the edge of the body, at which point it is clamped by a bonnet 20 screw threaded onto the outside of the cylindrical extension of the said body. This bellows forms a steam tight seal for the reciprocating valve disk, requiring no packing at any point.

The bonnet 20 has formed integrally therewith a cylindrical portion or barrel 21 which is coaxial with the bellows, the thimbles and pressure spring. It extends within and guides the bellows 18, and within it carries sleeve 22 which has an external coarse screw thread 23 fitted to a corresponding screw thread on the interior of this cylindrical extension 21 of the bonnet. This inner sleeve in the position of the parts in Fig. 2 has its inner end reaching to a point just in rear of the steam valve 2 and serves as a stop to determine the extent of the open position of the valve, or to close it entirely by hand.

The sleeve at its outer end has a flange 24 attached to a bakelite disc 25 of comparatively large diameter. The attachment is by means of screws 26 extending through the flange, through spacing washers and into the bakelite disc. This bakelite disc is attached to the flange or base 8 of the cell by screws 27 extending through heat insulating spacing thimbles 28. The use of these screws 27 separate from the screws 26 contributes to the prevention of heat from the valve body reaching the reservoir or cell 6, and its contained heat expansible material, because there is no continuous metallic connection between the metal sleeve 22 and the metal disc 8 attached to the cell, it being noted that the disc 25, as before stated, is of bakelite and is therefore a heat insulator, and a shield to prevent radiated heat from the valve body or heat by connection reaching the reservoir or holder of expansible liquid.

The vertically disposed metal flange 8 of the bulbular thermic cell is adapted to materially increase the effective radiating surface and sensitivity of said cell to changes in room temperature.

The bakelite disc 25 may serve alone or in combination with the cell as a handle for adjusting the screw threaded sleeve 22 in relation to the inlet port to serve as a stop for the valve and to alter the degree of opening of the valve. This disc bears a strip 29 of segmented form which may be set in various positions about the face of the disc near its edge, for which purpose the disc is provided with a series of threaded openings 30 to receive the screws 31. This dial strip is provided with indications "H", meaning hot, "C", meaning cold, and midway between these indications there is the indication "70", meaning that the appliance is set for seventy degrees of heat Fahrenheit, when the indication 70 lies opposite the pointer 32 on the valve body. The dial strip 29 has a projection 33 which comes against this pointer to limit the movement of the disc and its threaded sleeve in that direction which allows the valve to open to its maximum extent.

The screw 17 is adjustable in its thimble so that in installing the device upon a radiator said screw may be adjusted to secure the proper position of the valve disc relative to its operating mechanism, and to insure the automatic closing or opening of the valve under prescribed temperatures, or this adjustment may be made at the factory.

One object sought is to segregate the reservoir or cell containing the expansible material to the maximum extent from the influence of the heat from the valve body, whether this be by radiation, convection, or conduction. For this purpose the disc 25 of bakelite is employed, acting as a shield between the valve body and the cell 6, and air spaces $x$, $y$ and $z$ are left at the sides of this disc for the circulation of air. Furthermore, the member 12 is of wood to act as a heat insulator against conduction.

Suppose the device is set to maintain a room temperature of approximately 70° F. In installing the device for this temperature, it is subjected to a room temperature of 70° and it is then adjusted so that the valve will be open to the necessary degree for this temperature, the threaded sleeve having been adjusted by turning the bakelite disc, i. e., by grasping either it alone or by grasping the cell which may be used as a handle. This disc when adjusted to bring its dial mark 70° opposite the pointer, sets the sleeve, and the thermostatic element, so that they will allow the valve to open far enough to admit the amount of steam necessary to maintain the room at 70°.

While the sleeve 22 has been mentioned as a stop to limit the opening movement of the valve, its main function is a carrier for the thermostatic mechanism, for it will be noticed that when this sleeve is moved in the direction of its axis by turning it in its screw threaded connection with the bonnet 20, it will carry with it the bakelite disc to which it is rigidly connected by the screws 26, and as the cell is attached rigidly to the bakelite disc, it will move with the sleeve 22 and therefore the bellows 10, rod 11, the spring connection 16, thimbles 14, 15, and screws 17 will partake of this movement.

The valve 2, 3 will therefore be set closer to or further from the inlet port 5. This adjustment takes place for getting the prescribed changes in temperature. In other words, in adjusting the appliances for the desired temperature, the whole thermostatic mechanism is advanced as one body towards or away from the port 5. By unscrewing the sleeve 22 from the bonnet, the whole actuating element may be removed from the valve body, leaving therein only the valve and its sealing bellows 18. The thermostatic mechanism therefore can be readily replaced, or a simple thread manual operating handle can be inserted.

In operation, when the room temperature rises, the material in the cell or reservoir 6 expands, exerts pressure upon and contracts the bellows 10, thus forcing rod 11 to the left, axially, pushing the wood plug 12 against thimble 13, and the movement of this is transmitted through the loaded spring 16 to the thimble 15 and screw 17 and thence to the valve disc to give it a closing movement towards or against its seat. In this action the bellows 18 is extended. When the temperature falls, the liquid in the cell will decrease in volume, thereby relieving the bellows 10 of pressure, which therefore will retract rod 11 towards the right, and allow the screw 17, thimbles, spring 16 and plug or button 12 to move rightward, thus allowing the bellows 18 to retract the valve from its seat and admit steam.

When it is desired to shut off steam entirely by hand, the cell 6 or the disc 25 or both may be used as a handle to turn the sleeve 22, which, by reason of its coarse screw thread connection with the fixed barrel or cylinder 21, constituting a part of the valve casing, will advance rapidly leftward axially, and force the valve to its seat, the sleeve acting now as a push rod for the valve.

In the opening movement of the valve, the screw 17, thimbles 13 and 15, spring 16, wooden plug 12 and rod 11 all move rightward bodily.

The disc 25 performs a plurality of functions. It serves as a handle in the shutting off action, as a shield, and as a means of adjustment of the sleeve 22 and the thermostatic elements carried thereby. It also serves as a dial.

The sleeve 22 serves as a means of transmitting closing movement to the valve, in shutting off by hand, also as a stop to limit the opening movement of the valve, and as a carrier for the means of adjustment of the thermostat for setting changes in temperature.

The large bellows 18 acts as a steam tight seal and as the means for retracting the valve. All the main working parts are coaxially arranged, including the valve, bellows 18, cylindrical casing member 21, sleeve 22, screw 17, spring 16, thimbles 13 and 15, wooden plug 12, discs 25 and 8, rod 11, bellows 10 and the cell 6. There are no parts intended to depend or hang down from the structure, thus facilitating quick assembly or disassembly of the parts.

While it is obvious that any suitable expansive medium or fluid such as light petroleum may be used in carrying out my invention, or any other suitable form of expansive mechanism of a fluid nature or otherwise, could be substituted for the one shown, to illustrate my invention, I prefer, however, to use the acorn reservoir because it is non-yielding to high internal pressure, has a large cubical capacity for its external dimensions, combined with a maximum polar length to accommodate and guide the movable end of a very long central bellows.

The acorn form is so adapted as to be well guarded against mechanical injury by its large flange base. This combination also gives a very pleasing appearance.

While common coal oil or mixtures of more expansive materials therewith may be used as the expansive medium, I have discovered through experimentation that decidedly better results are secured by the use of acetone and still better by a mixture of acetone with one of the chlorides of carbon, preferably with the tetrachloride or chloroform.

Such a mixture has a very high cubical expansion, is of low specific heat capacity and is very mobile so that the temperature of the metal container is rapidly communicated throughout the liquid body by virtue of the rapid expansion and resultant circulation of its particles, coming in contact with the shell.

An additional advantage in this mixture of carbon tetrachloride with acetone is that the tetrachloride forms a safety factor against the inflammability of the acetone in case of leakage or in handling.

While I prefer to use a mixture of about half and half, the proportions may be considerably varied and still retain the advantages cited.

Pointer 32 in some cases could be made as a laterally sliding pin to enter any one of the twelve adjusting holes in the bakelite disc to act as a permanent lock to prevent disturbance of the adjustment.

I claim:

1. In combination with an inlet valve for a radiator or the like, thermostatic means for controlling said valve automatically including a thermostatic cell and resilient connections to the valve operated from the said cell for adjusting the valve relative to its seat, a part of said thermostatic means being manually rotatable and an unyielding connection between said rotary part operated longitudinally as a consequence of the rotation of said part for closing said valve by contacting a portion thereof, substantially as described.

2. An appliance according to claim 1 in which the said longitudinally movable unyielding valve closing connection consists of a sleeve, through which the automatic resilient connection extends.

3. In combination with an inlet valve for a radiator or the like, a casing, thermostatic means including a thermostatic cell and a connection from said cell arranged axially of the valve, for moving it automatically relative to its seat, a rotary member arranged coaxially with the valve and a sleeve rotatable by said member, said sleeve having a screw threaded connection with the casing for moving it longitudinally as it rotates to contact with and move the valve towards its seat, the said automatic connection extending through said sleeve, substantially as described.

4. In combination with an inlet valve for a steam radiator or the like, thermostatic means for controlling said valve, a sleeve extending within and rotatable in respect to the valve casing and carrying said thermostatic means, said sleeve having a screw thread connection with the valve casing, whereby when it is turned, it is advanced or retracted axially, together with the thermostatic means, said axial movement being towards and from the valve seat, said valve moving towards and from its seat with the corresponding movement of the thermostatic means, and a connection extending through said sleeve to operate the valve from the thermostatic means substantially as described.

5. An appliance according to claim 4 in which the sleeve is connected with a manually rotatable part of the thermostat, substantially as described.

6. In combination in an appliance of the type described, a steam inlet valve, a valve casing, a bellows connected with the valve and having a liquid tight connection with the casing, thermostatic means having a connection extending within said bellows for operating the valve automatically, and a sleeve extending within the bellows and surrounding the automatic thermostatic connection, said sleeve being operable to close the valve.

7. An apparatus according to claim 6 in which the sleeve is rotatably connected with the valve casing by a screw thread to be advanced or retracted thereby when it is rotated, substantially as described.

8. In combination, a valve casing to be attached to a radiator or the like, comprising a body and a bonnet screw threaded into connection therewith, a valve and valve seat within the casing, a bellows connected with the valve and having one end clamped between the bonnet and the valve body, a thermostatic connection extending through the bonnet to engage the valve to move it towards its seat against the retracting influence of said bellows, a sleeve rotatably mounted in the bonnet by a screw thread connection, and means for rotating the sleeve to advance or retract it, said sleeve controlling the valve relative to its seat.

9. In combination with a steam valve for a radiator or the like, thermostatic means, a connection for operating the valve, a valve casing, a sleeve having a screw thread connection with the casing, means for rotating the sleeve for moving it axially of the valve, said sleeve serving as a stop for the valve and said connection extending from the thermostatic means through the sleeve, substantially as described.

10. In combination, a valve, a casing therefor, a valve bonnet connected to the casing and having a cylindrical portion extending into and spaced from the casing, said portion being coaxial with the valve and its seat, a bellows connected with the valve surrounding the cylindrical portion of the bonnet and having its end clamped between the bonnet and the casing, a sleeve extending through the said cylindrical portion and having a screw thread connection therewith, means for turning the sleeve to advance or retract it relative to the valve and its seat, and a thermostatic connection extending through the sleeve to operate the valve, substantially as described.

11. In combination, a valve casing, a valve thereon, a thermostatic connection for operating the valve, arranged coaxially, a thermostatic cell for operating said connection, a heat shield from which said cell is supported, a sleeve within and having a screw threaded connection with the casing, surrounding the thermostatic connection and extending with its end in juxtaposed relation to the valve and arranged to control the position of the valve, said sleeve being connected with the heat shield, said heat shield being rotatable to rotate the sleeve and thereby advance or retract it relative to the valve seat, said cell, heat shield and sleeve being coaxial with the valve, substantially as described.

12. In combination a valve casing, a valve therein, a sleeve screw threaded into connection with the valve casing, a heat shield carried by the sleeve and by its turning to adjust the sleeve, thermostatic means carried by the shield, a connection from the thermostatic means extending from the thermostatic means through an opening in the shield and through the sleeve, and means independent of the sleeve for sealing the casing against the escape of steam, said shield when turned changing the position of the valve by means of said connection extending through it.

13. In combination with an inlet valve for steam radiators and the like, a casing, thermostatic means for controlling the valve, a sleeve screw threaded into the casing and carrying the thermostatic device, said sleeve forming the sole connection for supporting the thermostatic device and having its inner end to contact with said valve, a connection between the thermostatic device and the valve for operating the latter and extending through the sleeve, substantially as described.

14. In combination a valve, a casing having a seat therefor and a cylindrical portion coaxial with the valve, and extending in juxtaposed relation thereto, a sleeve extending through the cylindrical portion, and normally projecting therefrom so that the valve may contact therewith, said sleeve being screw threaded within said cylinder and removable therefrom, a thermostatic cell, a connection extending therefrom through the sleeve for operating the valve, said cell being carried by the sleeve and resilient means for opening the valve, said valve contacting with the end of the cylindrical portion when the sleeve is removed, substantially as described.

15. In a thermostatically controlled valve for radiators, the combination of a valve casing, a valve therein, thermostatic means for automatically opening and closing the valve, said thermostatic means comprising a thermostatic element immersed in a fluid, and a container for said fluid consisting of an imperforate shell, said container shell having a screw threaded connection with the valve casing to permit rotary movement of the shell for adjusting the valve, said shell serving as a handle by which it is turned.

16. A thermostatically controlled valve for radiators comprising a steam inlet valve, a valve casing, a thermostatic cell, a heat shield interposed between said cell and the valve casing, a sleeve screw threaded into the valve casing for adjustment, said sleeve carrying the heat shield which in turn has a heat nonconducting connection to the cell in spaced apart relation thereto, a connection extending from the cell through the shield and sleeve to the valve, said connection altering the position of the valve when the heat shield together with the sleeve and cell are rotated, and yielding means connected with valve and casing and within the casing for sealing the casing against escape of steam in all adjusted positions of the shield and screw threaded sleeve in respect to the casing, said shield insulating the cell against both radiated and conducted heat.

17. Apparatus according to claim 16 in which said shield serves as a dial and a pointer on the valve body cooperates with said dial for adjusting the valve.

18. In combination with an inlet valve for a steam radiator or the like, a valve casing, thermostatic means for controlling the valve, a sleeve extending into the valve casing coaxially with the valve, said sleeve carrying the thermostat and being adjustable in the casing lengthwise to contact the valve and determine its position relative to the valve seat, and a connection extending from the thermostat through the sleeve to operate the valve automatically, substantially as described.

In testimony whereof I affix my signature.

EDWARD S. HALSEY.